(12) United States Patent
Zhou et al.

(10) Patent No.: US 8,071,658 B2
(45) Date of Patent: Dec. 6, 2011

(54) PREPOLYMERS WITH DANGLING POLYSILOXANE-CONTAINING POLYMER CHAINS

(75) Inventors: Jian S. Zhou, Duluth, GA (US); Dawn A. Smith, Duluth, GA (US)

(73) Assignee: Novartis AG, Basel (CH)

( * ) Notice: Subject to any disclaimer, the term of this patent is extended or adjusted under 35 U.S.C. 154(b) by 371 days.

(21) Appl. No.: 12/077,772

(22) Filed: Mar. 21, 2008

(65) Prior Publication Data

US 2008/0231798 A1 Sep. 25, 2008

Related U.S. Application Data

(60) Provisional application No. 60/896,325, filed on Mar. 22, 2007.

(51) Int. Cl.
*C08F 283/12* (2006.01)
(52) U.S. Cl. .......................................... 522/99; 526/279
(58) Field of Classification Search .................. 526/279; 522/99
See application file for complete search history.

(56) References Cited

U.S. PATENT DOCUMENTS

| | | | |
|---|---|---|---|
| 4,136,250 A | 1/1979 | Mueller | |
| 4,229,273 A | 10/1980 | Wajs | 204/159.13 |
| 4,543,398 A | 9/1985 | Bany | |
| 4,703,097 A | 10/1987 | Wingler | |
| 4,780,515 A | 10/1988 | Deichert | 526/245 |
| 5,036,139 A * | 7/1991 | Spinelli | 525/326.5 |
| 5,070,169 A | 12/1991 | Robertson | |
| 5,070,170 A | 12/1991 | Robertson | |
| 5,070,215 A | 12/1991 | Bambury et al. | 556/418 |
| 5,219,965 A | 6/1993 | Valint et al. | 526/245 |
| 5,227,432 A | 7/1993 | Jung | 525/286 |
| 5,244,981 A | 9/1993 | Seidner | |
| 5,314,960 A | 5/1994 | Spinelli | |
| 5,314,961 A | 5/1994 | Anton | |
| 5,331,067 A | 7/1994 | Seidner | |
| 5,336,797 A | 8/1994 | McGee et al. | 556/419 |
| 5,358,995 A | 10/1994 | Lai et al. | 524/547 |
| 5,387,663 A | 2/1995 | McGee et al. | 526/279 |
| 5,449,729 A | 9/1995 | Lai | 526/286 |
| 5,505,884 A | 4/1996 | Burke et al. | 264/1.1 |
| 5,563,184 A | 10/1996 | McGee et al. | 523/107 |
| 5,665,840 A | 9/1997 | Pohlmann et al. | 526/264 |
| 5,708,094 A | 1/1998 | Lai et al. | 526/296 |
| 5,760,100 A | 6/1998 | Nicolson et al. | 523/106 |
| 5,807,944 A | 9/1998 | Hirt | |
| 5,981,669 A | 11/1999 | Valint et al. | 525/477 |
| 5,981,675 A * | 11/1999 | Valint et al. | 526/279 |
| 5,998,498 A | 12/1999 | Vanderlaan et al. | 523/107 |
| 6,039,913 A * | 3/2000 | Hirt et al. | 264/331.11 |
| 6,444,776 B1 | 9/2002 | Holland | |
| 6,762,264 B2 | 7/2004 | Kunzler et al. | 526/279 |
| 6,765,083 B2 | 7/2004 | Ford et al. | 528/491 |
| 6,822,016 B2 | 11/2004 | McCabe et al. | 523/107 |
| 6,943,203 B2 | 9/2005 | Vanderlaan et al. | 523/107 |
| 7,052,131 B2 | 5/2006 | McCabe et al. | 351/160 |
| 7,091,283 B2 | 8/2006 | Mueller et al. | 525/292 |
| 7,160,953 B2 * | 1/2007 | Bowers et al. | 525/326.6 |
| 7,238,750 B2 | 7/2007 | Mueller et al. | 525/292 |
| 7,249,848 B2 | 7/2007 | Laredo et al. | 351/160 |
| 7,268,189 B2 | 9/2007 | Mueller et al. | 525/292 |
| 7,566,754 B2 * | 7/2009 | Muller et al. | 525/292 |
| 2001/0037001 A1 | 11/2001 | Müller | |
| 2005/0237483 A1 | 10/2005 | Phelan | 351/162 |

FOREIGN PATENT DOCUMENTS

| | | |
|---|---|---|
| DE | 37 10343 A1 | 3/1987 |
| EP | 0 216 074 B1 | 7/1986 |
| EP | 0 331 633 B1 | 2/1989 |
| WO | WO 92/18548 | 10/1992 |
| WO | WO 92/09421 | 11/1992 |
| WO | WO 93/09084 | 5/1993 |
| WO | WO 93/23773 | 11/1993 |
| WO | WO 98/25982 | 6/1998 |
| WO | WO 00/59970 | 12/2000 |
| WO | 0171392 A1 | 9/2001 |

* cited by examiner

*Primary Examiner* — Margaret G Moore
(74) *Attorney, Agent, or Firm* — Jian Zhou

(57) ABSTRACT

The invention provide a new class of silicone-containing prepolymers containing dangling polysiloxane-containing polymer chains. This class of silicone-containing prepolymer is capable of being actinically crosslinked to form a silicone hydrogel material with a relatively high oxygen permeability, a reduced elastic modulus, and a relatively high ion permeability. The present invention is also related to silicone hydrogel contact lenses made from this class of silicone-containing prepolymers and to methods for making the silicone hydrogel contact lenses.

10 Claims, No Drawings

PREPOLYMERS WITH DANGLING POLYSILOXANE-CONTAINING POLYMER CHAINS

This application claims the benefit under 35 USC §119 (e) of U.S. provisional application No. 60/896,325 filed Mar. 22, 2007, incorporated herein by reference in its entirety.

The present invention is related to a class of silicone-containing prepolymers with dangling polysiloxane-containing polymer chains and uses thereof. In particular, the present invention is related to silicone hydrogel contact lenses made from this class of silicone-containing prepolymers.

BACKGROUND

In recent years, soft silicone hydrogel contact lenses has become popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen to permeate through the lens to the cornea and to have minimal adverse effects on corneal health.

However, all commercially available silicone hydrogel contact lenses are produced according to a conventional cast molding technique involving use of disposable plastic molds and a mixture of monomers and/or macromers. There are several disadvantages with such conventional cast-molding technique. For example, a traditional cast-molding manufacturing process must include lens extraction in which unpolymerized monomers must be removed from the lenses by using an organic solvent. Such lens extraction increases the production cost and decreases the production efficiency. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniform shrinkage after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (CIBA Vision), which involves (1) a lens-forming composition being substantially free of monomers and comprising a substantially purified prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,463, 5,789,464, and 5,849,810. Lenses can be produced at relatively lower cost according to the Lightstream Technology™ to have high consistency and high fidelity to the original lens design.

In order to fully utilize the Lightstream Technology™ to make silicone hydrogel contact lenses, there is still a need for new actinically-crosslinkable prepolymers suitable for making silicone hydrogel contact lenses with desired mechanical strength and desired physical properties according to the Lightstream Technology™.

SUMMARY OF THE INVENTION

The present invention, in one aspect, provides an actinically crosslinkable prepolymer. The prepolymer of the invention comprises: (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated group; (2) hydrophilic units derived from one or more hydrophilic vinylic monomers; (3) crosslinking units derived from at least one polysiloxane-containing crosslinker and/or at least one silicone-free crosslinker; and (4) optionally hydrophobic units derived from at least one hydrophobic vinylic monomer, wherein the prepolymer comprises multiple ethylenically unsaturated groups and is capable of being actinically crosslinked, in the absence of one or more monomers, to form a silicone hydrogel material.

In another aspect, the invention provides a soft contact lens. The soft contact lens of the invention comprises: a silicone hydrogel material that is obtained by curing a lens-forming material in a mold, wherein the lens-forming material comprises an actinically crosslinkable prepolymer and is substantially free of vinylic monomers and crosslinking agent with molecular weight of less than 1500 Daltons, wherein the prepolymer comprises (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated groups; (2) hydrophilic units derived from one or more hydrophilic vinylic monomers; (3) crosslinking units derived from at least one polysiloxane-containing crosslinker and/or at least one silicone-free crosslinker; (4) multiple ethylenically unsaturated groups; and (5) optionally hydrophobic units derived from at least one hydrophobic vinylic monomer.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically crosslinkable prepolymers and is substantially free of vinylic monomer and/or crosslinking agent with molecular weight less than 1500 Daltons, wherein each of said one or more prepolymers comprises (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated groups, (2) hydrophilic units derived from one or more hydrophilic vinylic monomers, (3) crosslinking units derived from at least one polysiloxane-containing crosslinker and/or at least one silicone-free crosslinker, (4) multiple ethylenically unsaturated groups, and (5) optionally hydrophobic units derived from at least one hydrophobic vinylic monomer; and actinically irradiating the composition in the mold to crosslink said one or more crosslinkable prepolymers to form the contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

A "macromer" refers to a medium and high molecular weight compound which can be polymerized and/or crosslinked. Medium and high molecular weight typically means average molecular weights greater than 700 Daltons.

A "polysiloxane" refers to a moiety of

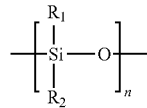

in which $R_1$ and $R_2$ are independently a monovalent $C_1$-$C_{10}$ alkyl, $C_1$-$C_{10}$ ether, $C_1$-$C_{10}$ fluoroalkyl, $C_1$-$C_{10}$ fluoroether, or $C_6$-$C_{18}$ aryl radical, which may comprise hydroxy group, primary, secondary, or tertiary amine group, carboxy group, or carboxylic acid; n is an integer of 4 or higher.

A "vinylic monomer", as used herein, refers to a monomer that has only one ethylenically unsaturated group and can be polymerized actinically or thermally.

The term "olefinically unsaturated group" or "ethylenicaly unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic vinylic monomer" refers to a vinylic monomer which can be polymerized to form a polymer that is water-soluble or can absorb at least 10 percent by weight of water when fully hydrated.

A "hydrophobic vinylic monomer", as used herein, refers to a vinylic monomer which is polymerized to form a polymer that is insoluble in water and can absorb less than 10 percent by weight water when fully hydrated.

A "prepolymer" refers to a starting polymer which contains multiple ethylenically unsaturated groups and can be cured (e.g., crosslinked) actinically to obtain a crosslinked polymer (i.e., final polymer) having a molecular weight much higher than the starting polymer.

"Multiple" ethylenically unsaturated groups means at least two, preferably at least three ethylenically unsaturated groups.

A "silicone-containing prepolymer" refers to a prepolymer which contains silicone and ethylenically unsaturated groups can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "ethylenically functionalize" in reference to a copolymer is intended to describe that one or more ethylenically unsaturated groups have been covalently attached to a copolymer through the pendant or terminal functional groups of the copolymer according to a coupling process. A "monoethylenically functionalized" in reference to a compound means that the compound has been modified chemically to contain one single ethylencially unsaturated group. A "diethylenically functionalized" a compound means that the compound has been modified chemically to contain only two ethylencially unsaturated groups.

The term "dangling polysiloxane units" of a prepolymer is intended to refer to the units each comprise a polysiloxane-containing polymer chain which is anchored to the main chain of the prepolymer through one single covalent linkage (preferably at one of the ends of the polysiloxane-containing polymer chain).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure®) 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, plasma processes in which an ionized gas is applied to the surface of an article (see, for example, U.S. Pat. Nos. 4,312,575 and 4,632,844 herein incorporated by reference in its entirety); a surface treatment by energy other than plasma (e.g., a static electrical charge, irradiation, or other energy source); chemical treatments; the grafting of hydrophilic monomers or macromers onto the surface of an article; mold-transfer coating process disclosed in U.S. Pat. No. 6,719,929 (herein incorporated by reference in its entirety); the incorporation of wetting agents into a lens formulation for making contact lenses (i.e., surface treatment prior to polymerization) proposed in U.S. Pat. Nos. 4,045,547, 4,042,552, 5,198,477, 5,219,965, 6,367,929 and 6,822,016, 7,279,507 (herein incorporated by references in their entireties); reinforced mold-transfer coating disclosed in PCT Patent Application Publication No. WO2007/146137 (herein incorporated by reference in its entirety); and layer-by-layer coating ("LbL coating") obtained according to methods described in U.S. Pat. Nos. 6,451,871, 6,719,929, 6,793,973, 6,811,805, 6,896,926 (herein incorporated by references in their entireties).

Exemplary plasma gases and processing conditions are described in U.S. Pat. Nos. 4,312,575 and 4,632,844. The plasma gas is preferably a mixture of lower alkanes and nitrogen, oxygen or an inert gas.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entirety).

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

[(cm³ oxygen)(mm)/(cm²)(sec)(mm² Hg)]×10⁻¹⁰

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)$$

(oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm²]
D=Ionoflux Diffusion Coefficient [mm²/min]
dc=concentration difference [mol/L]
dx=thickness of lens [mm]

The Ionoton Ion Permeability Coefficient, P, is then determined in accordance with the following equation:

$$ln(1-2C(t)/C(0))=-2APt/Vd$$

where: C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ mm²/min is preferred, while greater than about $2.6 \times 10^{-6}$ mm²/min is more preferred and greater than about $6.4 \times 10^{-6}$ mm²/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

A "reduced E modulus" or "reduced modulus" or "reduced Young's modulus" in reference to a testing silicone hydrogel lens obtained by crosslinking a first prepolymer with dangling polysiloxane polymer chains is intended to describe that the E modulus (or modulus) of the lens is smaller than a control lens obtained from a second prepolymer without dangling polysiloxane polymer chains but having substantially identical amount (by weight) of polysiloxane (based on compositions for making both the first and second prepolymers).

A "reduction in modulus ($\Delta E$)" of a lens is calculated based on the following formula $$\Delta E = \frac{E_{control} - E}{E_{control}} \times 100\%$$

in which E is the modulus of a testing lens obtained from a first prepolymer with dangling polysiloxane polymer chains and $E_{control}$ is the modulus of a control lens obtained from a second prepolymer without dangling polysiloxane polymer chains but having substantially identical amount (by weight) of polysiloxane (based on the compositions for making both the first and second prepolymers) as shown in Example 2.

An "increase in ion permeability ($\Delta(IP)$)" of a lens is calculated based on the following formula $$\Delta IP = \frac{IP - IP_{control}}{IP_{control}} \times 100\%$$

in which IP is the ion permeability of a testing lens obtained from a first prepolymer with dangling polysiloxane polymer chains and $IP_{control}$ is the ion permeability of a control lens obtained from a second prepolymer without dangling polysiloxane polymer chains but having substantially identical amount (by weight) of polysiloxane (based on the compositions for making both the first and second prepolymers) as shown in Example 2.

In general, the invention is directed to a class of actinically crosslinkable silicone-containing prepolymers. It is partly based on discovery that by incorporating dangling polysiloxane polymer chains into an actinically crosslinkable silicone-containing prepolymer, such prepolymer can be used to produce silicone hydrogel contact lenses having a reduced E modulus and substantially equivalent oxygen permeability. The ion permeability of the resultant lenses can be enhanced by incorporating dangling polysiloxane polymer chains. Such prepolymers can be used to prepare silicone hydrogel contact lenses, in particularly according to the Lightstream Technology™ (CIBA Vision).

The present invention, in one aspect, provides an actinically crosslinkable prepolymer. The prepolymer of the invention comprises: (1) dangling polysiloxane units derived from one or more monoethylenically functionalized polysiloxane-containing monomers and/or one or more monoethylenically-functionalized polysiloxane-containing macromers, wherein the dangling polysiloxane units are free of ethylenically unsaturated group; (2) hydrophilic units derived from one or more hydrophilic vinylic monomers; (3) crosslinking units derived from at least one polysiloxane-containing crosslinker and/or at least one silicone-free crosslinker; and (4) optionally hydrophobic units derived from at least one hydrophobic vinylic monomer, wherein the prepolymer comprises multiple ethylenically unsaturated groups and is capable of being actinically crosslinked, in the absence of one or more monomers, to form a silicone hydrogel material.

The dangling polysiloxane-containing units of the prepolymer each should be free of any ethylenically unsaturated groups.

In accordance with the invention, a prepolymer of the invention is obtained from an intermediary copolymer with pendant or terminal functional group by ethylenically functionalizing the intermediary copolymer to include multiple ethylenically unsaturated groups, according to any covalently coupling method.

It is well known in the art that a pair of matching reactive groups can form a covalent bond or linkage under known coupling reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group reacts with aldehyde group to form a Schiff base which may further be reduced; an amino group reacts with an acid chloride to form an amide linkage (—CO—N—); an amino group reacts with an isocyanate to form a urea linkage; an hydroxyl reacts with an isocyanate to form a urethane linkage; an hydroxyl reacts with an epoxy to form an ether linkage (—O—); a hydroxyl reacts with an acid chloride to form an ester linkage.

Exemplary covalent bonds or linkage, which are formed between pairs of crosslinkable groups, include without limitation, ester, ether, acetal, ketal, vinyl ether, carbamate, urea, urethane, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary reactive groups include hydroxyl group, amine group, amide group, anhydride group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy.

It is understood that coupling agents may be used. For example, a carbodiimide can be used in the coupling of a carboxyl and an amine to form an amide linkage between the molecules being coupled. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Preferably, the functional group of the intermediary copolymer is selected from the group consisting of hydroxyl groups (—OH), primary amino groups (—$NH_2$), secondary amino groups (—NHR), carboxyl groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof.

In a preferred embodiment, the intermediary copolymer with pendant or terminal functional groups is obtained by copolymerization of a polymerizable composition comprising (1) at least one monoethylenically functionalized polysiloxane-containing monomer and/or at least one monoethylenically unsaturated polysiloxane-containing macromer, (2) at least one hydrophilic vinylic monomer (i.e., having one ethylenically unsaturated group), (3) at least one polysiloxane-containing crosslinker and/or at least one silicone-free crosslinker, and (4) optionally at least one hydrophobic vinylic monomer, provided that at least one of components (2)-(4) further comprises at least one functional group through which an ethylenically unsaturated group can be covalently linked to the obtained intermediary copolymer.

In another preferred embodiment, the intermediary copolymer with pendant or terminal functional groups is obtained by copolymerization of a composition comprising (1) at least one monoethylenically functionalized polysiloxane-containing monomer and/or at least one monoethylenically unsaturated polysiloxane-containing macromer, (2) at least one hydrophilic vinylic monomer (i.e., having one ethylenically unsaturated group), (3) at least one polysiloxane-containing crosslinker and/or at least one silicone-free crosslinker, (4) optionally at least one hydrophobic vinylic monomer, and (5) at least one chain transfer agent having a functional group through which an ethylenically unsaturated group can be covalently linked to the obtained intermediary copolymer.

Any known suitable monoethylenically functionalized polysiloxane-containing monomers or macromers (i.e., polysiloxane-containing monomers or macromers with one sole ethylenically unsaturated group) can be used in the actinically polymerizable composition for preparing the intermediary copolymer with pendant or terminal functional groups.

A preferred class of monoethylenically functionalized polysiloxane-containing monomers or macromers are those defined by formula (I)

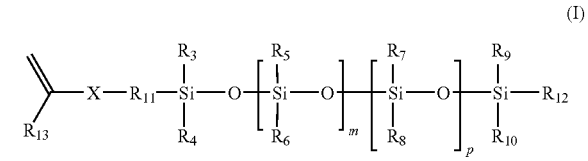

in which X denotes —COO—, —$CONR_{14}$—, —OCOO—, or —$OCONR_{14}$—, where each $R_{14}$ is independently H or $C_1$-$C_7$ alkyl; $R_{11}$ denotes a divalent $C_1$-$C_{25}$ alkyl or $C_6$-$C_{30}$ aryl radical, which may interrupted by —O—, —COO—, —$CONR_{14}$—, —OCOO— or —$OCONR_{14}$— and may comprise hydroxy group, primary, secondary, or tertiary amine group, carboxy group, or carboxylic acid; $R_{12}$ is a monovalent $C_1$-$C_{25}$ alkyl or $C_6$-$C_{30}$ aryl radical, which may interrupted by —O—, —COO—, —$CONR_{14}$—, —OCOO— or —$OCONR_{14}$— and may comprise hydroxy group, primary, secondary, or tertiary amine group, carboxy group, or carboxylic acid; $R_3$, $R_4$, $R_5'$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), hydroxy-$C_1$-$C_6$-alkyl or amino-$C_1$-$C_6$-alkyl; x is the number 0 or 1, m and p independently of each other are an integer of from 5 to 700 and (m+p) is from 5 to 700. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane). Alternatively, monoethylenically functionalized polysiloxanes can be obtained by ethylenically functionalizing of a monofunctionalized polysiloxanes (i.e., with one sole terminal functional group, such as, e.g., —$NH_2$, —OH, —COOH, epoxy group, etc.) as described above. Suitable monofunctionalized polysiloxanes are commercially available, e.g., from Aldrich, ABCR GmbH & Co., Fluorochem, or Gelest, Inc, Morrisville, Pa.

Nearly any hydrophilic vinylic monomer can be used in the actinically polymerizable composition for preparing the intermediary copolymer with pendant or terminal functional groups. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methyl-propanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkyla-mide, and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol(meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

In accordance with the invention, polysiloxane-containing crosslinkers refers to polysiloxane-containing compounds, macromers or prepolymer, which comprises two or more ethylenically unsaturated groups. Examples of polysiloxane-containing crosslinkers include without limitation dimethacrylated or diacrylated polydimethylsiloxanes of various molecular weight; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; polysiloxane-containing prepolymers disclosed in U.S. Pat. No. 6,762,264 (here incorporated by reference in its entirety); prepolymers disclosed in PCT patent application publication No. WO00/59970 (herein incorporated by reference in its entirety); prepolymers disclosed in U.S. Pat. No. 7,091,283 (herein incorporated by reference in its entirety); polysiloxane crosslinkers and polysiloxane/perfluoroalkyl ether block copolymer crosslinkers disclosed in U.S. Pat. No. 7,091,283 (herein incorporated by reference in its entirety); di and tri-block macromers consisting of polydimethylsiloxane and polyalkyleneoxides (e.g., methacrylate end capped polyethyleneoxide-block-polydimethylsiloxane-block-polyethyleneoxide); and mixtures thereof. It is understood that perfluoroalkyl ether crosslinkers, such as those disclosed in U.S. Pat. No. 7,091,283 (herein incorporated by reference in its entirety), can also be used as crosslinkers in the invention.

Alternatively, di- or multi-ethylenically functionalized polysiloxanes can be obtained by ethylenically functionalizing of a di- or multi-functionalized polysiloxanes (i.e., with two or more terminal functional groups, such as, e.g., —$NH_2$, —OH, —COOH, epoxy groups, etc.) as described above. Suitable di- or multi-functionalized polysiloxanes are commercially available, e.g., from Aldrich, ABCR GmbH & Co., Fluorochem, or Gelest, Inc, Morrisville, Pa.

In accordance with the invention, silicone-free crosslinkers are vinylic compounds, macromers, or prepolymers, having two or more ethylenically unsaturated groups.

Examples of silicone-free crosslinkers include without limitation tetraethyleneglycol dimethacrylate (TEGDMA), triethyleneglycol dimethacrylate (TrEGDMA), ethyleneglycol dimethacylate (EGDMA), ethylenediamine dimethyacrylamide, glycerol dimethacrylate and combinations thereof.

Examples of hydrophilic prepolymers with multiple acryloyl or methacryloyl groups (as silicone-free crosslinkers) include, but are not limited to, a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Patent Application Publication No. 2004/0082680; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. No. 6,479,587 and in U.S. Published Application No. 2005/0113549; crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth) acrylate prepolymers disclosed in EP 961,941 and U.S. Pat. No. 6,221,303; and crosslinkable polyallylamine gluconolactone prepolymers disclosed in International Application No. WO 2000/31150 and U.S. Pat. No. 6,472,489.

Nearly any hydrophobic vinylic monomer can be used in the actinically polymerizable composition for preparing the intermediary copolymer with pendant or terminal functional groups. Suitable hydrophobic vinylic monomers include, without limitation, silicone-containing vinylic monomers, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-haloalkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of preferred hydrophobic vinylic monomers include methylacrylate, ethylacrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonylaminoethyl-methacrylate, isobornyl methacrylate, trifluoroethyl methacrylate, hexafluoro-isopropyl methacrylate, and hexafluorobutyl methacrylate.

The chain transfer agent may comprise one or more thiol groups, for example two or most preferably one thiol group. Suitable chain transfer agents include without limitation 2-mercaptoethanol, 2-aminoethanethiol, 2-mercaptopropinic acid, thioglycolic acid, thiolactic acid, or other hydroxymercaptanes, aminomercaptans, carboxyl-containing mercaptanes, and mixtures thereof. Where a chain transfer agent comprises a functional group in addition to one or more thiol groups, it can be incorporated into the resultant intermediary copolymer and provide functionality for subsequent addition of an ethylenically unsaturated group to the intermediary copolymer. A chain transfer agent can also be used to control the molecular weight of the resultant copolymer.

Any know suitable vinylic monomer containing at least one functional group can be used in the actinically polymerizable composition for preparing the intermediary copolymer with pendant or terminal functional groups. The functional groups of units derived from such vinylic monomer can be used in ethylenically functionalizing the intermediary copolymers. Preferred examples of such vinylic monomers includes methacrylic acid (MAA), acrylic acid, glycidylmethacrylate, glycidylacrylate, HEMA, HEA, aminopropyl methacrylate hydrochloride, methacrylic anhydride, N-hydroxymethylacrylamide (NHMA), 2-bromoethylmethacrylate, and vinylbenzylchoride.

It should be understood that a vinylic monomer can be used both as a hydrophilic vinylic monomer and as a functionalizing vinylic monomer in the actinically polymerizable composition for preparing the intermediary copolymer with pendant or terminal functional groups. Preferably, the hydrophilic vinylic monomer is devoid of functional groups (e.g., DMA, NVP).

In another preferred embodiment, a polymerizable composition for making an intermediary copolymer of the invention further comprises at least one silicone-containing vinylic monomer.

Examples of preferred silicone-containing vinylic monomers (i.e., with one sole ethylenically unsaturated group) include, without limitation, 3-methacryloxy propylpentamethyldisiloxane, bis(methacryloxypropyl)tetramethyl-disiloxane, N-[tris(trimethylsiloxy)silylpropyl]acrylamide, N-[tris(trimethylsiloxy)silylpropyl]methacrylamide, and tristrimethylsilyloxysilylpropyl methacrylate (TRIS), N-[tris (trimethylsiloxy)silylpropyl]methacrylamide ("TSMAA"), N-[tris(trimethylsiloxy)-silylpropyl]acrylamide ("TSAA"), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)propyloxy)propylbis(trimethylsiloxy) methylsilane, N-2-methacryloxyethyl-O-(methyl-bis-trimethylsiloxy-3-propyl)silyl carbamate, silicone-containing vinyl carbonate or vinyl carbamate monomers (e.g., 1,3-bis[4-vinyloxycarbonyloxy)but-1-yl]tetramethyldisiloxane; 3-(trimethylsilyl), propyl vinyl carbonate, 3-(vinyloxycarbonylthio)propyl-[tris(trimethylsiloxy)silane], 3-[tris(trimethylsiloxy)silyl]propylvinyl carbamate, 3-[tris (trimethylsiloxy)silyl]propyl allyl carbamate, 3-[tris(trimethylsiloxy)silyl]propyl vinyl carbonate, t-butyldimethylsiloxyethyl vinyl carbonate; trimethylsilylethyl vinyl carbonate, and trimethylsilylmethyl vinyl carbonate).

The polymerizable composition for preparing an intermediary copolymer can be a melt, a solventless liquid in which all necessary components are blended together preferably in the presence of one or more blending vinylic monomers, or a solution in which all necessary component is dissolved in a solvent, such as water, an organic solvent, or mixture thereof, as known to a person skilled in the art.

Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

The one or more blending vinylic monomers are in an amount sufficient to dissolve both hydrophilic and hydrophobic components of the actinically polymerizable composition. A "blending vinylic monomer" refers to a vinylic monomer which can function both as a solvent to dissolve both hydrophilic and hydrophobic components of an actinically polymerizable composition and as one of polymerizable components to be polymerized to form a silicone hydrogel material. Preferably, the blending vinylic monomer is present in the actinically polymerizable composition in an amount of from about 5% to about 30% by weight.

Any suitable vinylic monomers, capable of dissolving both hydrophilic and hydrophobic components of a polymerizable composition of the invention to form a solution, can be used in the invention. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinyinaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$-$C_6$ alkyl groups. Styrene itself [$H_2C$=$CH$—$C_6H_5$] is a particularly preferred styrene-containing monomer.

A cycloalkyl-containing vinylic monomer is defined herein to be a vinylic monomer containing a cycloalkyl which can be substituted by up to three $C_1$-$C_6$ alkyl groups. Preferred cycloalkyl-containing vinylic monomers include, without limitation, acrylates and methacrylates each comprising a cyclopentyl or cyclohexyl or cycloheptyl, which can be substituted by up to 3 $C_1$-$C_6$ alkyl groups. Examples of preferred cycloalkyl-containing vinylic monomers include isobornylmethacrylate, isobornylacrylate, cyclohexylmethacrylate, cyclohexylacrylate, and the like.

The stoichiometry of the hydrophilic monomer, crosslinker and chain transfer agent in the polymerizable composition for preparing an intermediary copolymer may be chosen within wide limits and is strongly dependant on the intended use. For example, a molar ratio of from 0.5 to 5 equivalents chain transfer agent: 1-3 equivalents monoethylenically functionalized polysiloxane-containing monomer and macromer (in total): 1 equivalent crosslinker (including polysiloxane-containing crosslinker and silicone-free crosslinker): 5 to 60 equivalents hydrophilic monomer(s) has proven as practicable for biomedical purposes. A preferred range is from 1 to 3 molar equivalents chain transfer agent: 1-3 equivalents monoethylenically functionalized polysiloxane-containing monomer and macromer (in total): 1 equivalent crosslinker (including polysiloxane-containing crosslinker and silicone-free crosslinker): 10 to 50 molar equivalents hydrophilic monomer(s).

The weight average molecular weight of the resulting copolymers is strongly dependent, for example, on the amount of chain transfer agent used, preferably from 3000 to 1000000, preferably from 5000 to 500000, more preferably from 7000 to 250000 daltons.

The copolymerization of a polymerizable composition for preparing an intermediary copolymer may be induced photochemically or preferably thermally. Suitable thermal polymerization initiators are known to the skilled artisan and comprise, for example peroxides, hydroperoxides, azo-bis (alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis(1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere. Copolymerization can yield optically clear well-defined copolymers which may be worked up in conventional manner using for example extraction, precipitation, ultrafiltration and the like techniques.

In a preferred embodiment, the dangling polysiloxane units is present in the prepolymer in an amount sufficient to provide the lens made from the prepolymer with a reduction in modulus of at least about 10% or more, preferably at least about 20% or more, even more preferably at least about 30% or more, most preferably at least about 40% or more.

In another preferred embodiment, the dangling polysiloxane units is present in the prepolymer in an amount sufficient to provide the lens made from the prepolymer with an increase in ion permeability of at least about 20% or more, preferably at least about 40% or more, even more preferably at least about 60% or more.

The amount of the dangling polysiloxane units in the prepolymer can be changed by adjusting the amount of the one or more monoethylenically functionalized polysiloxane-containing monomers and/or one or more monoethylenically-functionalized polysiloxane-containing macromers in the polymerizable composition for preparing the intermediary copolymer with pendant or terminal functional groups while maintaining the total weight percentage of all polysiloxane-containing polymerizable components.

Preferably, a prepolymer of the invention comprises: (1) from about 2% to about 70% by weight, preferably from about 5% to about 40%, of dangling polysiloxane units derived from one or more monoethylenically functionalized polysiloxane-containing monomers and/or macromers; (2) from about 10% to about 70%, preferably from about 20% to 60% by weight, by weight of hydrophilic units derived from one or more hydrophilic monomers; (3) from 0 to about 70%, preferably from about 1% to about 60%, more preferably from about 5% to about 50% by weight of crosslinking polysiloxane units derived from a polysiloxane-containing crosslinker; (4) from 0 to about 5%, more preferably from 0 to about 2% by weight of silicone-free crosslinker; and (5) from about 0 to about 35%, preferably from about 1% to about 30% by weight of silicone-containing units derived from one or more silicone-containing vinylic monomers.

In accordance with the invention, ethylenical functionalization of the intermediary copolymer can be carried out by covalently attaching ethylenically unsaturated groups to the functional groups (e.g., amine, hydroxyl, carboxyl, isocyanate, epoxy groups) of the intermediary copolymer. Any vinylic monomer having a hydroxy, amino, carboxyl, epoxy, acid-chloride, isocyanate group, which is co-reactive with isocyanate, amine, hydroxyl, carboxy, or epoxy groups of an intermediary copolymer in the absence or presence of a coupling agent (such as, e.g., EDC, diisocyanate, or diacid chloride), can be used in ethylenically functionalizing the intermediary copolymer. Examples of such vinylic monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethylbenzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select a vinylic monomer with a functional group to functionalize ethylenically intermediary copolymers.

A prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and an elastic modulus of preferably about 1.5 MPa or less, more preferably about 1.2 or less, even more preferably from about 0.4 MPa to about 1.0 MPa. By having a higher percentage of dangling polysiloxane units than crosslinked polysiloxane units, a prepolymer of the invention can be used to prepare silicone hydrogel contact lenses having a relatively low elastic modulus while having a relatively high oxygen permeability.

The silicone hydrogel material or contact lens preferably has a high ion permeability (characterized by an Ionoflux Diffusion Coefficient, D, of greater than about $1.5 \times 10^{-6}$ mm$^2$/min, preferably greater than about $2.6 \times 10^{-6}$ mm$^2$/min, more preferably greater than about $6.4 \times 10^{-6}$ mm$^2$/min). The silicone hydrogel material or contact lens preferably has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in a pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can, in principle, be as high as desired. A suitable measure for the degree of purity is, for example, the concentration of dissolved salts obtained as by-products, which can be determined simply in a known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

In another aspect, the invention provides a soft contact lens. The soft contact lens of the invention comprises: a silicone hydrogel material that is obtained by curing a lens-forming material in a mold, wherein the lens-forming material comprises an actinically crosslinkable prepolymer and is substantially free of vinylic monomers and crosslinking agent with molecular weight of less than 1500 dalton, wherein the prepolymer comprises (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated groups; (2) hydrophilic units derived from one or more hydrophilic vinylic monomers; (3) crosslinking units derived from at least one polysiloxane-containing crosslinker and/or at least one silicone-free crosslinker; (4) multiple ethylenically unsaturated groups; and (5) optionally hydrophobic units derived from at least one hydrophobic vinylic monomer.

In accordance with the invention, a lens-forming material is a composition, which can be a solution or a melt at a temperature from about 20° C. to about 85° C. Preferably, a lens-forming material is a solution of at least one prepolymer of the invention and other desirable components in water, or an organic solvent, or a mixture of water and one or more organic solvents.

A solution of at least one prepolymer can be prepared by dissolving the prepolymer and other components in any suitable solvent known to a person skilled in the art. Examples of suitable solvents are described above.

All of the various embodiments of the prepolymer of the invention described above can be used in this aspect of the invention.

The lens-forming material can optionally but preferably does not comprise one or more vinylic monomer and/or one or more crosslinking agents (i.e., compounds with two or more ethylenically unsaturated groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the lens-forming material is substantially free of vinylic monomer and crosslinking agent (i.e., preferably about 2% or less, more preferably about 1% or less, even more preferably about 0.5% or less by weight of combination of vinylic monomer and crosslinking agent).

It must be understood that a lens-forming material can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyidiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronite (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C—K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, Iodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials and non-crossllinkable hydrophilic polymers (i.e., without ethylenically unsaturated groups). Exemplary mucin-like materials include without limitation polyglycolic acid, polylactides, collagen, hyaluronic acid, and gelatin.

Any hydrophilic polymers or copolymers without any ethylenically unsaturated groups can be used as leachable lubricants. Preferred examples of non-crossllinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

The molecular weight of the non-crosslinkable hydrophilic polymer is preferably from about 20,000 to about 1,500,000 daltons, more preferably from about 50,000 to 1,200,000 daltons, even more preferably from 100,000 to 1,000,000 daltons.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz, glass, $CaF_2$, and sapphire.

In a preferred embodiment, when the polymerizable components in the lens-forming material is composed essentially of prepolymers, reusable molds can be used. Examples of reusable molds made of quartz or glass are those disclosed in U.S. Pat. No. 6,627,124, which is incorporated by reference in their entireties. In this aspect, the lens-forming material is poured into a mold consisting of two mold halves, the two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the lens-forming material is dispensed into the mold, it is polymerized to produce a contact lens. Crosslinking and/or polymerizing may be initiated in the mold e.g. by means of actinic radiation, such as UV irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

The crosslinking according to the invention may be effected in a very short time, e.g. in ≦60 minutes, advantageously in ≦20 minutes, preferably in ≦10 minutes, most preferably in ≦5 minutes, particularly preferably in 1 to 60 seconds and most particularly in 1 to 30 seconds.

The contact lenses according to the invention can be produced from one or more radiation-curable prepolymers of the invention in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. There is no practical need for subsequent purification, such as in particular complicated extraction of unpolymerized constituents after curing lenses. Furthermore, the new polymerization method can be used to produce contact lenses with desirable mechanical and physical properties. Finally, photo-polymerization is effected within a short period, so that from this point of view also the production process for the contact lenses according to the invention may be set up in an extremely economic way.

Opening of the mold so that the molded article can be removed from the mold may take place in a manner known per se.

If the molded contact lens is produced solvent-free from an already purified prepolymer according to the invention, then after removal of the molded lens, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

If the molded contact lens is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtained by this process are therefore notable, according to an advantageous embodiment, for the fact that they are suitable for their intended usage without extraction. By intended usage is understood, in this context, that the contact lenses can be used in the human eye.

Similarly, if the molded contact lens is produced from a solvent solution of an already purified prepolymer according to the invention, it is not necessary to carry out subsequent extraction, but instead of hydration process to replace the solvent.

The molded contact lenses can be further subjected to further processes, such as, for example, surface treatment, sterilization, and the like.

A contact lens of the invention has an oxygen permeability of preferably at least about 40 barrers, more preferably at least about 60 barrers, even more preferably at least about 80 barrers; and an elastic modulus of about 1.5 MPa or less, preferably about 1.2 MPa or less, more preferably about 1.0 MPa or less. In accordance with the invention, an oxygen permeability is an apparent (directly measured when testing a sample with a thickness of about 100 microns) oxygen permeability according to procedures described in Examples.

A contact lens of the invention further has an ion permeability characterized by having an Ionoflux Diffusion Coefficient, D, of, preferably at least about $1.5 \times 10^{-6}$ mm$^2$/m in, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 55%, more preferably from about 20% to about 38% by weight when fully hydrated. The water content of a silicone hydrogel contact lens can be measured according to Bulk Technique as disclosed in U.S. Pat. No. 5,849,811.

All of the various embodiments of the prepolymer described above can be used in this aspect of the invention.

In a further aspect, the invention provides a method for producing soft contact lenses. The method comprises the steps of: comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically crosslinkable prepolymers and is substantially free of vinylic monomer and/or crosslinking agent, wherein each of said one or more prepolymers comprises (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated groups, (2) hydrophilic units derived from one or more hydrophilic vinylic monomers, (3) crosslinking units derived from at least one polysiloxane-containing crosslinker and/or at least one silicone-free crosslinker, (4) multiple ethylenically unsaturated groups, and (5) optionally hydrophobic units derived from at least one hydrophobic vinylic monomer; and actinically irradiating the composition in the mold to crosslink said one or more crosslinkable prepolymers to form the contact lens.

All of the various embodiments of the prepolymer and contact lens of the invention described above can be used in this aspect of the invention.

The previous disclosure will enable one having ordinary skill in the art to practice the invention. In order to better enable the reader to understand specific embodiments and the advantages thereof, reference to the following examples is suggested.

Example 1

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H.D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]

$$P_{oxygen} = (P_{measured} - P_{water}\text{ vapor}) = (\% O_2 \text{ in air stream})$$
[mm Hg]=partial pressure of oxygen in the air stream $P_{measured}$=barometric pressure (mm Hg)

$P_{water}$ vapor=0 mm Hg at 34° C. (in a dry cell) (mm Hg)

$P_{water}$ vapor=40 mm Hg at 34° C. (in a wet cell) (mm Hg)

t=average thickness of the lens over the exposed test area (mm)

where $Dk_{app}$ is expressed in units of barrers. The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of 0.314×10$^{-3}$ mm$^2$/minute.

Example 2

Preparation of Initiator Solution

Initiator solutions are prepared by dissolving a desired amount of an initiator in t-amyl alcohol as shown in Table 1. The resulting solution is stirred and degassed at room temperature 2 times for 5 minutes each below 50 mbar.

TABLE 1

| | Example | |
|---|---|---|
| Reactant | 2a (grams) | 2b (grams) |
| AIBN | 0.059 | 0.059 |
| t-amyl alcohol | 11.40 | 11.44 |

Preparation of Reactor Solution

Various reactants shown in Table 2 are weighed into a 500 mL reactor equipped with vacuum and nitrogen. The resulting solution is stirred and chilled to 4° C. and then degassed 10 times for 5 minutes each at less than 1 mbar, using nitrogen to back-fill.

TABLE 2

| | Example | |
|---|---|---|
| Reactant | 2a (grams) | 2b (grams) |
| PDMS-11500 diacrylamide | 11.50 | 8.05 |
| PDMS-5000 monomethacrylate "MCR-M17" * | NA | 3.45 |
| Aminopropyl methacrylate hydrochloride | 1.33 | 1.33 |
| Acrylic Acid | 0.04 | 0.04 |
| Hydroxyethyl acrylate | 5.30 | 5.30 |
| N,N-dimethylacrylamide | 7.96 | 7.96 |
| t-amyl alcohol | 320.42 | 320.35 |

* from Gelest

Preparation of Prepolymer

A reactor solution temperature prepared above is rapidly raised to 68° C. At this temperature, an initiator solution is injected in while taking care to exclude oxygen from the system. This system is allowed to react for 5 hours when the temperature is rapidly reduced to room temperature.

The cooled reaction solution is filtered through a Por 3 fritted Buchner funnel with 1-propanol rinsing. To the filtered solution, 0.016 g hydroxyl-TEMPO is added. The solution is rotovapped at 45° C. and 80-100 mbar to remove the alcohols in three steps, each time replacing the removed alcohol with deionized water until less than ~5% solvent remained. This process results in an emulsion.

70% of this emulsion is taken for the acrylation step as follows. The emulsion is chilled to 0° C. and the pH is adjusted to 9.5 using NaOH. A total of 580 μL of acryloyl chloride (96% pure) is added in two additions of 290 μL each. The solution is warmed to at least 10° C. when it is neutralized to pH7 using 2N HCl. This emulsion is filtered through a Por3 fritted Buchner. It is then ultra-filtered using a Millipore PLGC 10K regenerated cellulose cartridge until the permeate has a conductivity less than 3 μS/cm. It is concentrated slightly to ~1% solids in water on the ultrafiltration unit and then freeze-dried. The powder resulting from this process is termed a prepolymer.

Preparation of Silicone Hydrogel Contact Lenses

A lens formulation is prepared from a prepolymer prepared above by mixing 65% prepolymer with 0.16% Irgacur 2959 (relative to total formulation) and 34.84% 1-propanol. After dissolution, the formulation is dosed into PP molds, cured under a Hamamatsu lamp at 4 mW/cm$^2$ for about 44 seconds (Example 2a) and about 60 seconds (Example 2b) respectively.

The resulting lenses are demolded using water at room temperature. Lenses are not extracted. Lenses are autoclaved for 30 minutes at 121° C. in phosphate buffered saline. Lens properties are determined and reported in Table 3. It is found that by substituting about 3.45% of polysiloxane crosslinker with a monomethacrylate PDMS (for forming a prepolymer with dangling polysiloxane polymer chains), the resultant lenses have a reduction in modulus of about $$44\% \left( \frac{1.33 - 0.75}{1.33} \times 100\% \right),$$

an increase in IP of about $$109\% \left( \frac{18 - 8.6}{8.6} \times 100\% \right),$$

and substantially unchanged oxygen permeability (Dk).

TABLE 3

| Example | NVE, % residual | water content (%) | Dk* (barrer) | Modulus E' (MPa) | average ETB % | diameter (mm) | IP# |
|---|---|---|---|---|---|---|---|
| 2a | 7.6 | 36 | 88 | 1.33 | 158 | 13.8 | 8.6 |
| 2b | 11.5 | 38 | 89 | 0.75 | 157 | 14.2 | 18 |

NVE: non-volatile extractable;
*apparent Dk;
ETB: elongation at break;
ion permeability relative to Alsacon.

What is claimed is:

1. An actinically crosslinkable prepolymer, comprising:
   (1) dangling polysiloxane units derived from one or more monoethylenically functionalized polysiloxane-containing monomers and/or one or more monoethylenically-functionalized polysiloxane-containing macromers, wherein the dangling polysiloxane units is free of ethylenically unsaturated group;
   (2) hydrophilic units derived from one or more hydrophilic vinylic monomers;
   (3) polysiloxane-containing crosslinking units derived from at least one polysiloxane-containing crosslinker, wherein said at least one polysiloxane-containing crosslinker comprises two or more ethylenically unsaturated groups and a moiety of

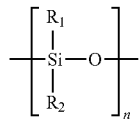

in which $R_1$ and $R_2$ are independently a monovalent $C_1$-$C_{10}$ alkyl, $C_1$-$C_{10}$ ether, $C_1$-$C_{10}$ fluoroalkyl, $C_1$-$C_{10}$ fluoroether, or $C_6$-$C_{18}$ aryl radical, which mah comprise hydroxy group, primary, secondary, or tertiary amine group, carboxy group, or carboxylic acid; $n$ is an integer of 4 or higher; and
   (4) optionally hydrophobic units derived from at least one hydrophobic vinylic monomer, wherein the prepolymer comprises multiple ethylenically unsaturated groups and is capable of being actinically crosslinked, in the absence of one or more monomers, to form a silicone hydrogel contact lens.

2. The prepolymer of claim 1, wherein the dangling polysiloxane units is present in the prepolymer in an amount sufficient to provide the silicone hydrogel contact lens with a reduction in modulus of at least about 10% or more and/or with an increase in ion permeability of at least about 20% or more.

3. The prepolymer of claim 1, wherein the dangling polysiloxane units is present in the prepolymer in an amount sufficient to provide the silicone hydrogel contact lens with a reduction in modulus of at least about 30% or more and/or with an increase in ion permeability of at least about 60% or more.

4. The prepolymer of claim 2, wherein the prepolymer is obtained from an intermediary copolymer with pendant or terminal functional groups and the dangling polysiloxane units by covalently attaching actinically crosslinkable groups to the intermediary copolymer through the pendant or terminal functional groups, wherein the pendant or terminal functional groups are selected from the group consisting of hydroxy groups, amino groups (—$NH_2$), carboxyl groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof.

5. The prepolymer of claim 4, wherein the intermediary copolymer is obtained by copolymerization of an actinically polymerizable composition A or B, wherein the composition A comprises the components of:
   (1) at least one monoethylenically functionalized polysiloxane-containing monomer and/or at least one monoethylenically unsaturated polysiloxane-containing macromer,
   (2) at least one hydrophilic vinylic monomer,
   (3) at least one polysiloxane-containing crosslinker, and
   (4) optionally at least one hydrophobic vinylic monomer, provided that at least one of components (2)-(4) further comprises at least one functional group through which an ethylenically unsaturated group can be covalently linked to the obtained intermediary copolymer, wherein the composition B comprises the components of:
   (1) at least one monoethylenically functionalized polysiloxane-containing monomer and/or at least one monoethylenically unsaturated polysiloxane-containing macromer,
   (2) at least one hydrophilic vinylic monomer,
   (3) at least one polysiloxane-containing crosslinker,
   (4) optionally at least one hydrophobic vinylic monomer, and
   (5) at least one chain transfer agent having a functional group through which an ethylenically unsaturated group can be covalently linked to the obtained intermediary copolymer.

6. The prepolymer of claim 5, wherein the at least one monoethylenically functionalized polysiloxane-containing monomer and the at least one monoethylenically unsaturated polysiloxane-containing macromer independently of each other are defined by

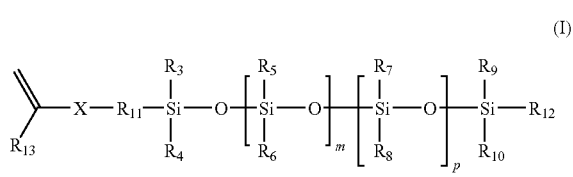
(I)

in which X denotes —COO—, —CONR$_{14}$, —OCOO—, or —OCONR$_{14}$—, where each R$_{14}$ is independently H or C$_1$-C$_7$ alkyl; R$_{11}$ denotes a divalent C$_1$-C$_{25}$ alkyl or C$_6$-C$_{30}$ aryl radical, which may be interrupted by —O—, —COO—, —CONR$_{14}$—, —OCOO— or —OCONR$_{14}$— and may comprise hydroxy group, primary, secondary, or tertiary amine group, carboxy group, or carboxylic acid; R$_{12}$ is a monovalent C$_1$-C$_{25}$ alkyl or C$_6$-C$_{30}$ aryl radical, which may interrupted by —O—, —COO—, —CONR$_{14}$—, —OCOO— or —OCONR$_{14}$— and may comprise hydroxy group, primary, secondary, or tertiary amine group, carboxy group, or carboxylic acid; R$_3$, R$_4$, R$_5$', R$_6$, R$_7$, R$_8$, R$_9$ and R$_{10}$, independently of one another, are C$_1$-C$_8$-alkyl, C$_1$-C$_4$ alkyl- or C$_1$-C$_4$— alkoxy-substituted phenyl, fluoro(C$_1$-C$_{18}$)alkyl), cyano(C$_1$-C$_{12}$-alkyl), hydroxy-C$_1$-C$_6$-alkyl or amino-C$_1$-C$_6$-alkyl; m and p independently of each other are an integer of from 5 to 700 and (m+p) is from 5 to 700.

7. The prepolymer of claim 6, wherein the at least one hydrophilic vinylic monomer is selected from the group consisting of N,N-dimethylacrylamide (DMA), 2-hydroxyethyl-methacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1-dimethyl-3-oxobutyl)acrylamide, acrylic acid, a C$_1$-C$_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and combinations thereof.

8. The prepolymer of claim 7, wherein the polymerizable composition A or B further comprises at least one silicone-containing vinylic monomer which is different from the monoethylenically functionalized polysiloxane-containing monomer and/or the monoethylenically unsaturated polysiloxane-containing macromer.

9. The prepolymer of claim 8, wherein the at least one silicone-containing vinylic monomer is selected from the group consisting of 3-methacryloxy propylpentamethyldisiloxane, bis(methacryloxypropyl)tetramethyl-disiloxane, N-[tris(trimethylsiloxy)silylpropyl]-acrylamide, N-[tris(trimethylsiloxy)silylpropyl]methacrylamide, and tris(trimethyl-silyloxy)silylpropylmethacrylate, N-[tris(trimethylsiloxy)silylpropyl]methacrylamide, N-[tris(trimethylsiloxy)silylpropyl]acrylamide, (3-methacryloxy-2-hydroxypropyloxy)-propylbis(trimethylsiloxy)methylsilane, (3-methacryloxy-2-hydroxypropyloxy)propyl-tris(trimethylsiloxy)silane, (3-methacryloxy-2-(2-hydroxyethoxy)propyloxy)propyl-bis(trimethylsiloxy)methylsilane, N-2-methacryloxyethyl-O-(methyl-bis-trimethylsiloxy-3-propyl) silylcarbamate, 1,3-bis[4-vinyloxycarbonyloxy)but-1-yl] tetramethyl-disiloxane, 3-(trimethylsilyl)propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate, trimethylsilylethyl vinyl carbonate, trimethylsilylmethyl vinyl carbonate, and combinations thereof.

10. The prepolymer of claim 8, wherein intermediary copolymer comprises: (1) from about 5% to about 40% by weight of dangling polysiloxane units derived from one or more monoethylenically functionalized polysiloxane-containing monomers and/or macromers; (2) from about 20% to about 60% by weight of hydrophilic units derived from one or more hydrophilic monomers; (3) from 1% to about 60% by weight of crosslinking polysiloxane units derived from a polysiloxane-containing crosslinker; (4) from 0 to about 2% by weight of silicone-free crosslinker; and (5) from about 1 to about 30% by weight of silicone-containing units derived from one or more silicone-containing vinylic monomers.

* * * * *